United States Patent
Deng et al.

(10) Patent No.: US 9,507,693 B2
(45) Date of Patent: Nov. 29, 2016

(54) METHOD, DEVICE AND COMPUTER-READABLE STORAGE MEDIUM FOR CLOSURE TESTING

(71) Applicant: TENCENT TECHNOLOGY (SHENZHEN) COMPANY LIMITED, Guangdong (CN)

(72) Inventors: Xiongbing Deng, Guangdong (CN); Zishun Chen, Guangdong (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 99 days.

(21) Appl. No.: 14/502,920

(22) Filed: Sep. 30, 2014

(65) Prior Publication Data

US 2015/0020045 A1    Jan. 15, 2015

Related U.S. Application Data (63) Continuation of application No. PCT/CN2014/071391, filed on Jan. 24, 2014.

(30) Foreign Application Priority Data

Mar. 8, 2013  (CN) .......................... 2013 1 0074678

(51) Int. Cl.
G06F 11/36  (2006.01)
G06F 9/44   (2006.01)

(52) U.S. Cl.
CPC ............ *G06F 11/3672* (2013.01); *G06F 8/30* (2013.01); *G06F 11/36* (2013.01); *G06F 11/3612* (2013.01); *G06F 11/3636* (2013.01); *G06F 11/3664* (2013.01); *G06F 11/3696* (2013.01)

(58) Field of Classification Search
None
See application file for complete search history.

(56) References Cited

U.S. PATENT DOCUMENTS 8,612,938 B2 * 12/2013 Prasad ................ G06F 11/3612
                                                 717/124
2005/0223363 A1 * 10/2005 Black-Ziegelbein G06F 11/3624
                                                 717/127

(Continued)

FOREIGN PATENT DOCUMENTS

| CN | 101349994 A | 1/2009 |
| CN | 101630350 A | 1/2010 |
| CN | 102231109 A | 11/2011 |

OTHER PUBLICATIONS

Translation of Written Opinion of the International Search Authority and International Search Report for PCT/CN2014/071391 mailed on Apr. 30, 2014 in 12 pages.

*Primary Examiner* — Lewis A Bullock, Jr.
*Assistant Examiner* — Mark Gooray
(74) *Attorney, Agent, or Firm* — Knobbe Martens Olson & Bear LLP (57) ABSTRACT

A method for closure testing is disclosed. The method includes: acquiring an identification of a closure to be tested; generating code to be inserted based on the identification of the closure to be tested; searching and obtaining a corresponding annotation based on the identification of the closure to be tested, and determining a closure corresponding to the identification of the closure to be tested based on the annotation; adding the generated code to be inserted to the searched closure; and testing the closure added the code to be inserted. In addition, the present disclosure also discloses a device for closure testing. For the above method and device for closure testing, it reduces the burden of the tester and improves testing efficiency, and the source code published to the network need not to make an internal interface in a closure be exposed for testing, which improves the security of the program.

9 Claims, 4 Drawing Sheets

(56) References Cited

U.S. PATENT DOCUMENTS

| | | | |
|---|---|---|---|
| 2009/0249368 A1* | 10/2009 | Needamangala | G06F 8/67 719/328 |
| 2009/0254883 A1* | 10/2009 | Munson | G06F 11/3624 717/124 |
| 2010/0037100 A1* | 2/2010 | Lopian | G06F 11/3688 714/35 |
| 2011/0078507 A1* | 3/2011 | Choi | G06F 11/3668 714/32 |
| 2014/0068552 A1* | 3/2014 | Szocs | G06F 8/30 717/108 |

* cited by examiner

METHOD, DEVICE AND COMPUTER-READABLE STORAGE MEDIUM FOR CLOSURE TESTING

CROSS REFERENCE TO RELATED APPLICATION

This application is a continuation application of an International Application No. PCT/CN2014/071391, filed on Jan. 24, 2014, entitled "METHOD, DEVICE AND COMPUTER-READABLE STORAGE MEDIUM FOR CLOSURE TESTING" by Xiongbing DENG and Zishun CHEN, which claims the priority from the Chinese patent application No. CN 201310074678.X, filed on Mar. 8, 2013. The above-referenced applications are hereby incorporated herein in their entireties by reference.

TECHNICAL FIELD

The present disclosure relates to software testing filed, and more particularly, to a method, and device, and computer-readable storage medium for closure testing.

BACKGROUND

JavaScript is an interpreted computer programming language. As part of web browsers, implementations allow client-side scripts to interact with the user, control the browser, communicate asynchronously, and alter the document content that is displayed. It has also become common in server-side programming, game development and the creation of desktop applications. The synthesis composed of code executed in JavaScript and scope executing the code is called closure, and all of JavaScript functions are closures.

For a closure implemented by an anonymous function, an interface in the closure can not be directly called outside of the closure, and the data within it can not be read or written from outside. Because a function in the closure can not be directly called or a variable value in the closure can not be acquired from outside for a closure implemented by an anonymous function, the closure can not be performed by a white-box testing which is a method of testing software that tests software code from statement and function interfaces layer based on the implementation logic in the code by a tester.

In conventional technology, in order to implement a white-box testing of the closure implemented by an anonymous function, it often needs to adjust the code of the closure to be tested that some interface methods in the closure can be adjusted in a certain way (such as adjusting code) to associate an internal method or data to a externally accessible global object, and this makes the method or data inside the closure can be directly accessed by the code outside the closure, so as to realize a white-box testing. However, using the above method to implement a white-box testing has several problems as follows:

Firstly, the method violates the original purpose of using a closure in sound code, and it makes the benefit brought by the closure disappear, for example, the advantage of hiding internal interface and data is disappeared;

Secondly, because each closure implemented by an anonymous function to be under white-box testing may need to be made an adjustment to the code, the workload of the adjustment depends on the concrete implementation of the closure, and possible restriction of the external test cases runtime environment exists, the workload of the adjustment is heavy;

Thirdly, it needs to have a test of the adjusted closure source code for verifying its function and logic to ensure the program operating properly after the adjustment of the code required for testing, and such test brings additional load for a tester; and Fourthly, in more extreme cases, for example, the interface or data inside the closure is not allowed to be exposed by the application environment of the closure for security or other reasons, the interface can not be called or acquired by external test code so that the white-box testing can not be implemented.

In conclusion, conventional methods for closure testing are low in testing efficiency and security.

SUMMARY

In view of the above, an object of the present disclosure is to provide a method for closure testing, which can improve testing efficiency and security.

Another object of the present disclosure is to provide a device for closure testing, which can improve testing efficiency and security.

According to one aspect of the disclosure, a method for closure testing includes:

acquiring an identification of a closure to be tested;

generating code to be inserted based on the identification of the closure to be tested;

searching and obtaining a corresponding annotation based on the identification of the closure to be tested, and determining a closure corresponding to the identification of the closure to be tested based on the annotation;

adding the generated code to be inserted to the searched closure; and testing the closure added the code to be inserted.

Preferably, the step of acquiring an identification of a closure to be tested includes acquiring a test case file and parsing the test case file to get an identification of the closure to be tested.

Preferably, before the step of acquiring an identification of a closure to be tested, it further includes previously setting a corresponding annotation in a reservation position of the closure to be tested.

Preferably, the reservation position can be the first position outside, an optional position inside or the end position of the closure, and corresponding relation information of the identification of the closure to be tested contained in the annotation is information with predetermined format.

Preferably, the step of adding the generated code to be inserted to the searched closure includes adding the generated code to be inserted to a predetermined position in the searched closure.

According to another aspect of the disclosure, a device for closure testing includes:

an acquisition module configured to acquire an identification of a closure to be tested;

a generation module configured to generate code to be inserted based on the identification of the closure to be tested;

a search module configured to search and obtain a corresponding annotation based on the identification of the closure to be tested, and determine a closure corresponding to the identification of the closure to be tested based on the annotation;

an addition module configured to add the generated code to be inserted to the searched closure; and a testing module configured to test the closure added the code to be inserted.

Preferably, the acquisition module also can be configured to acquire a test case file and parse the test case file to get an identification of the closure to be tested.

Preferably, the device further includes a preset module configured to previously set a corresponding annotation in a reservation position of the closure to be tested.

Preferably, the reservation position can be the first position outside, an optional position inside or the end position of the closure, and corresponding relation information of the identification of the closure to be tested contained in the annotation is information with predetermined format.

Preferably, the addition module also can be configured to add the generated code to be inserted to a predetermined position in the searched closure.

According to still a further aspect of the disclosure, a non-transitory computer-readable storage medium comprising an executable program to execute a method for closure testing, the method includes:

acquiring an identification of a closure to be tested;

generating code to be inserted based on the identification of the closure to be tested;

searching and obtaining a corresponding annotation based on the identification of the closure to be tested, and determining a closure corresponding to the identification of the closure to be tested based on the annotation;

adding the generated code to be inserted to the searched closure; and testing the closure added the code to be inserted.

The above method and device for closure testing, find the annotation containing the corresponding relation information of the identification of the closure to be tested by the identification of the closure to be tested, determine a closure corresponding to the closure to be tested based on the annotation, and add the code to be inserted generated by the identification of the closure to be tested to be inserted to a closure corresponding to the closure to be tested, which makes internal function or data of the closure to be tested be called or accessed by external and ensure the smooth operation of white-box testing. The method simply adds an annotation corresponding to the closure with a small workload, which does not change effective contents in the source code file that it needs no additional function testing, reducing the burden of the tester and improving testing efficiency, and the annotation added for testing will be removed before the tested source code is published to the network, which makes the published source code is the same as the code before added an annotation for testing, so that it will not bring addition testing work for the added annotation. Meanwhile, the source code published to the network need not to make an internal interface in a closure be exposed for testing, which improves the security of the program.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 4:
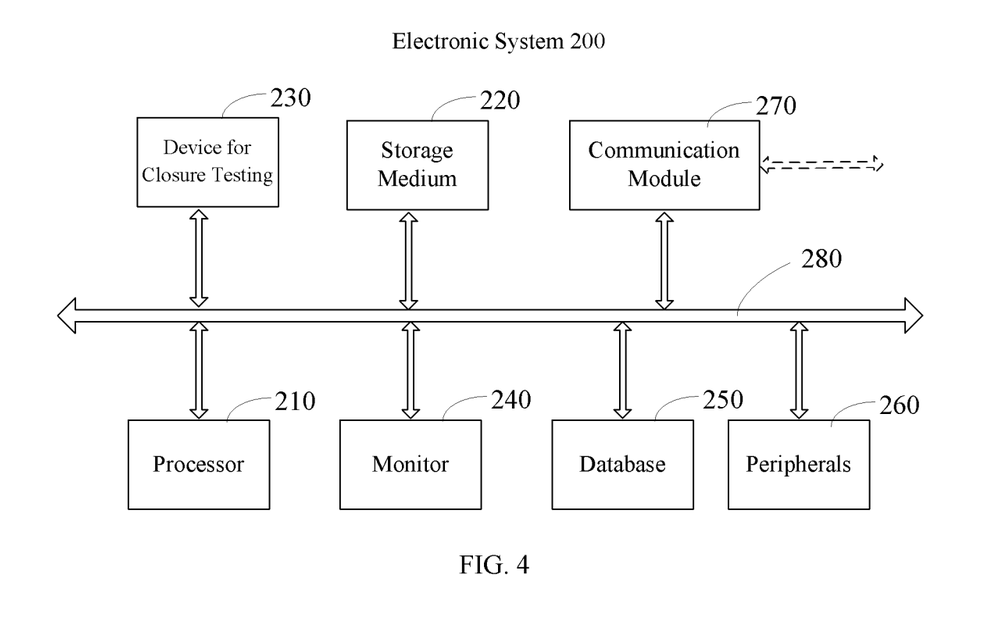
FIG. 4 depicts an exemplary electronic system incorporating certain disclosed embodiments.

FIG. 4 depicts an exemplary electronic system incorporating exemplary method and device for closure testing in accordance with various disclosed embodiments. As shown in FIG. 4, the electronic system 200 may include a processor 210, a storage medium 220, a device for closure testing 230, a monitor 240, a database 250, peripherals 260, a communication module 270, and one or more bus 280 to couple the devices together. Certain devices may be omitted and other devices may be included.

The processor 210 can include any appropriate processor or processors. Further, the processor 210 can include multiple cores for multi-thread or parallel processing. The device for closure testing 230 according to embodiments of the present disclosure will be described in detail in the following description. The storage medium 220 may include memory modules, e.g., Read-Only Memory (ROM), Random Access Memory (RAM), and flash memory modules, and mass storages, e.g., CD-ROM, U-disk, removable hard disk, etc. The storage medium 220 may store computer programs for implementing various processes (e.g., executing a method for closure testing), when executed by the processor 210. The monitor 240 may include display devices for displaying contents in the electronic system 200, e.g., displaying codes or report information. The peripherals 260 may include I/O devices such as keyboard and mouse. Further, the communication module 270 may include network devices for establishing connections through the communication network. The database 250 may include one or more databases for storing certain data and for performing certain operations on the stored data.

In various embodiments, the method and device disclosed in accordance with various embodiments can be executed by an electronic system. In operation, the processor 210 may cause the device for closure testing 230 to operate in an executable program stored in the storage medium 220 to execute a method for closure testing.

Various embodiments provide methods and devices for performing closure testing. The methods and devices are illustrated in various examples described herein.

Figure 1:
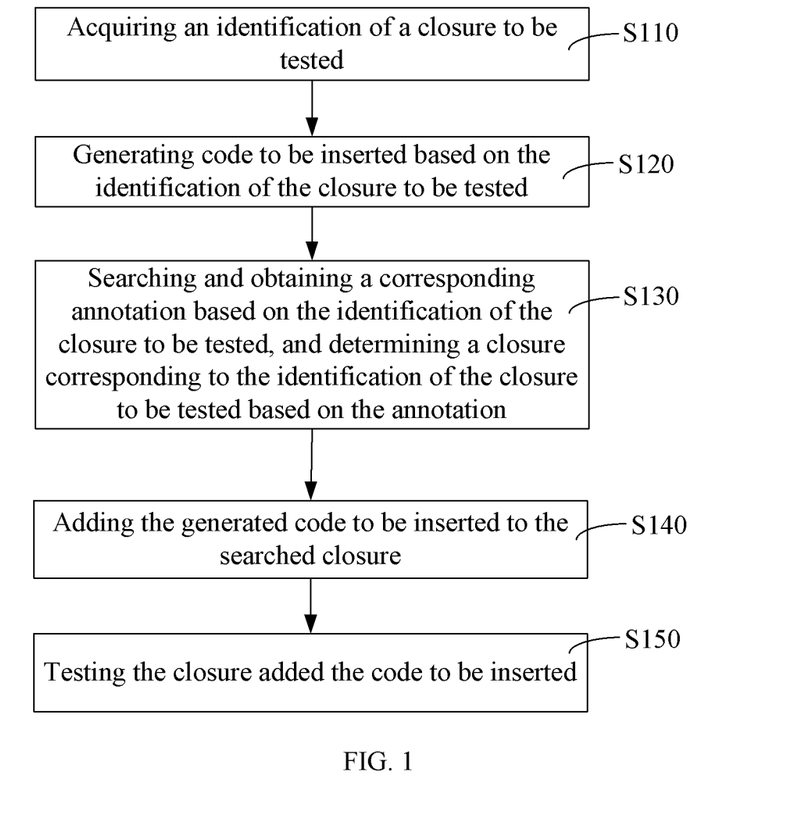
FIG. 1 is a flow diagram illustrating a method for closure testing according to one embodiment of the present disclosure.

As shown in FIG. 1, in one embodiment of the present disclosure, a method for closure testing includes:

Step S110, acquiring an identification of a closure to be tested.

Specifically, an identification of a closure to be tested is used to distinguish closures which have unique identification, and it can be a closure name or a closure number. Fox example, the closure name is a, and the closure identification is 001.

In the embodiment, when write a white-box test case file for specific code to be tested, the identification of the closure to be tested is assigned in a certain format, so acquire the test case file, and the identification of the closure to be tested can be obtained by parsing the test case file.

Before the step of S110, it further includes a step that previously set a corresponding annotation in a reservation position of the closure to be tested.

Specifically, an annotation includes corresponding relation information of the identification of the closure to be tested, for example, the annotation includes an identification of the closure. For example, if the identification of the closure is a closure name, the annotation can includes a closure name or a closure number corresponding to the closure name; if the identification of the closure is a closure number, the annotation can includes a closure number or a closure name corresponding to the closure number. The corresponding relation information of the identification of the closure to be tested contained in the annotation is in a certain format, for example, @closure name.

The reservation position can be the first position outside, an optional position inside or the end position of the closure. The first position outside is a position in front of the outside of the corresponded closure to be tested in the source code file, for example, @a closure code, and @a is an annotation; an optional position inside is an optional position inside the optional position to be tested; and the end position is a position in back of the outside of the corresponded closure to be tested in the source code file, for example, closure code @a, and @a is an annotation. A source code file can includes a plurality of closures, previously set a positional relation between the annotation and the closure to be tested, and the position of the corresponding closure can be determined by the positional relation between the pre-set annotation and the closure to be tested and the searched position of the annotation.

Step S120, generating code to be inserted based on the identification of the closure to be tested.

Specifically, the generated code to be inserted is mainly used to assign the parameter in the closure to be tested is a global parameter that the method and interface of the closure can be exposed to make the contents in the closure be accessed by external.

Step S130, searching and obtaining a corresponding annotation based on the identification of the closure to be tested, and determining a closure corresponding to the identification of the closure to be tested based on the annotation.

Specifically, the position of the corresponding annotation can be found from the source code file after acquiring the identification of the closure to be tested, and the position of the closure can be determined by the positional relation between the annotation and the closure to be tested. For example, if the annotation is located at first position outside the closure to be tested, after searching the corresponding annotation, it can be determined that the closure located at the back of the annotation is the closure to be searched that corresponds to the identification of the closure to be tested; if the annotation is located at end outside the closure, after searching the corresponding annotation, it can be determined that the closure located at the front of the annotation is the closure to be searched that corresponds to the identification of the closure to be tested; and if the annotation is located at optional position inside the closure, after searching the corresponding annotation, it can be determined that the closure located at the annotation is the closure to be searched that corresponds to the identification of the closure to be tested.

Step S140, adding the generated code to be inserted to the searched closure.

Specifically, add the generated code to be inserted to a predetermined position in the searched closure. The predetermined position can be an optional position in the closure, for example, but not restricted to, head position of the closure, middle position of the closure or end position of the closure. In the embodiment, the predetermined position is located at the head position of the closure, which makes the closure to be searched easier to be called and accessed under the white-box testing.

Step S150, testing the closure added the code to be inserted.

Specifically, run the test case file, and test the closure added the code to be inserted. Because the method and interface in the closure are exposed for the inserted code, the closure can be called and accessed.

The above method for closure testing, find the annotation containing the corresponding relation information of the identification of the closure to be tested by the identification of the closure to be tested, determine a closure corresponding to the closure to be tested based on the annotation, and add the code to be inserted generated by the identification of the closure to be tested to be inserted to a closure corresponding to the closure to be tested, which makes internal function or data of the closure to be tested be called or accessed by external and ensure the smooth operation of white-box testing. The method simply adds an annotation corresponding to the closure with a small work-load, which does not change effective contents in the source code file that it needs no additional function testing, reducing the burden of the tester and improving testing efficiency, and the annotation added for testing will be removed before the tested source code (JavaScript) is published to the network, which makes the published source code is the same as the code before added an annotation for testing, so that it will not bring addition testing work for the added annotation. Meanwhile, the source code published to the network need not to make an internal interface in a closure be exposed for testing, which improves the security of the program.

Figure 2:
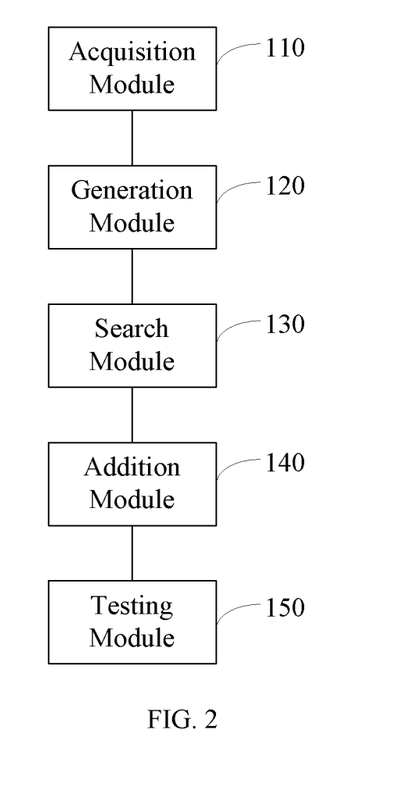
FIG. 2 is a structure diagram illustrating a device for closure testing according to one embodiment of the present disclosure.

As shown in FIG. 2, in one embodiment of the present disclosure, a device for closure testing includes an acquisition module 110, a generation module 120, a search module 130, an addition module 140 and a testing module 150.

The acquisition module 110 is configured to acquire an identification of a closure to be tested.

Specifically, an identification of a closure to be tested is used to distinguish closures which have unique identification, and it can be a closure name or a closure number. Fox example, the closure name is a, and the closure identification is 001.

In the embodiment, when write a white-box test case file for specific code to be tested, the identification of the closure to be tested is assigned in a certain format, so the acquisition module 110 acquires the test case file, and parses the test case file to get the identification of the closure to be tested.

The generation module 120 is configured to generate code to be inserted based on the identification of the closure to be tested.

Specifically, the generated code to be inserted is mainly used to assign the parameter in the closure to be tested is a global parameter that the method and interface of the closure can be exposed to make the contents in the closure be accessed by external.

The search module 130 is configured to search and obtain a corresponding annotation based on the identification of the closure to be tested, and determine a closure corresponding to the identification of the closure to be tested based on the annotation.

Specifically, the position of the corresponding annotation can be found from the source code file after acquiring the identification of the closure to be tested, and the position of the closure can be determined by the positional relation between the annotation and the closure to be tested. For example, if the annotation is located at first position outside the closure to be tested, after searching the corresponding annotation, it can be determined that the closure located at the back of the annotation is the closure to be searched that corresponds to the identification of the closure to be tested; if the annotation is located at end outside the closure, after searching the corresponding annotation, it can be determined that the closure located at the front of the annotation is the closure to be searched that corresponds to the identification of the closure to be tested; and if the annotation is located at optional position inside the closure, after searching the corresponding annotation, it can be determined that the closure located at the annotation is the closure to be searched that corresponds to the identification of the closure to be tested. Wherein, the first position outside is a position in front of the outside of the corresponded closure to be tested in the source code file, for example, @a closure code, and @a is an annotation; an optional position inside is an optional position inside the optional position to be tested; and the end position is a position in back of the outside of the corresponded closure to be tested in the source code file, for example, closure code @a, and @a is an annotation. A source code file can includes a plurality of closures, previously set a positional relation between the annotation and the closure to be tested, and the position of the corresponding closure can be determined by the positional relation between the pre-set annotation and the closure to be tested and the searched position of the annotation.

The addition module 140 is configured to add the generated code to be inserted to the searched closure.

Specifically, the addition module 140 is also configured to add the generated code to be inserted to a predetermined position in the searched closure. The predetermined position can be an optional position in the closure, for example, but not restricted to, head position of the closure, middle position of the closure or end position of the closure. In the embodiment, the predetermined position is located at the head position of the closure, which makes the closure to be searched easier to be called and accessed under the white-box testing.

The testing module 150 is configured to test the closure added the code to be inserted.

Specifically, run the test case file, and test the closure added the code to be inserted. Because the method and interface in the closure are exposed for the inserted code, the closure can be called and accessed.

The above device for closure testing, find the annotation containing the corresponding relation information of the identification of the closure to be tested by the identification of the closure to be tested, determine a closure corresponding to the closure to be tested based on the annotation, and add the code to be inserted generated by the identification of the closure to be tested to be inserted to a closure corresponding to the closure to be tested, which makes internal function or data of the closure to be tested be called or accessed by external and ensure the smooth operation of white-box testing. The method simply adds an annotation corresponding to the closure with a small work-load, which does not change effective contents in the source code file that it needs no additional function testing, reducing the burden of the tester and improving testing efficiency, and the annotation added for testing will be removed before the tested source code (JavaScript) is published to the network, which makes the published source code is the same as the code before added an annotation for testing, so that it will not bring addition testing work for the added annotation. Meanwhile, the source code published to the network need not to make an internal interface in a closure be exposed for testing, which improves the security of the program.

Figure 3:
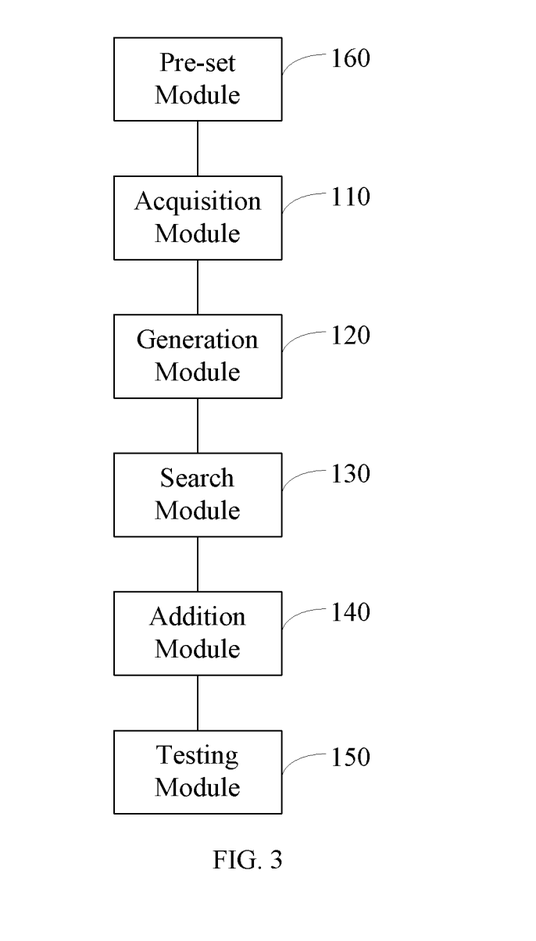
FIG. 3 is a structure diagram illustrating a device for closure testing according to another embodiment of the present disclosure.

Further, in one embodiment of the present disclosure, in addition to the acquisition module 110, the generation module 120, the search module 130, the addition module 140 and the testing module 150, the above device for closure testing also includes a pre-set module 160.

The pre-set module 160 is configured to previously set a corresponding annotation in a reservation position of the closure to be tested. Specifically, an annotation includes a corresponding relation information of the identification of the closure to be tested, for example, the annotation includes an identification of the closure. For example, if the identification of the closure is a closure name, the annotation can includes a closure name or a closure number corresponding to the closure name; if the identification of the closure is a closure number, the annotation can includes a closure number or a closure name corresponding to the closure number. The corresponding relation information of the identification of the closure to be tested contained in the annotation is in a certain format, for example, @closure name.

The reservation position can be the first position outside, an optional position inside or the end position of the closure.

It should be understood for a person skilled in the art that partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory.

The above embodiments described are only several embodiments of the present disclosure, and they should not be understood as a limitation on the scope of the present disclosure. It should be noted that the modifications and variations could be made by the skilled in the art, which will be within the protection scope of the present disclosure. The protection scope of this disclosure is defined by the appending claims.

What is claimed is:

1. A method for closure testing, comprising:
    acquiring an identification of a closure to be tested, wherein acquiring comprises:
        acquiring a white-box test case file that includes code associated with testing the closure, wherein the closure is implemented by an anonymous function;
        parsing the white-box test case file to get the identification of the closure to be tested;
    generating code to be inserted based on the identification of the closure to be tested, wherein the generated code enables access to the closure;
    determining a closure, in a source code file to be tested, corresponding to the identification of the closure to be tested, the determination comprising searching one or more annotations associated with closures, the annotations being in a reservation position including a first position outside, a position inside or an end position of the closures associated with the annotations;

adding the generated code in the source code file at a predetermined position in the determined closure; and externally testing the closure according to the white-box test case file using the generated code.

2. The method according to claim 1, wherein before the step of acquiring an identification of a closure to be tested, the method further comprises: previously setting a corresponding annotation in the reservation position of the closure to be tested.

3. The method according to claim 2, wherein corresponding relation information of the identification of the closure to be tested contained in the annotation is information with predetermined format.

4. A device comprising one or more processors and a non-transitory computer storage medium storing instructions that when executed by the one or more processors cause the one or more processors to perform operations comprising:

acquiring a white-box test case file that includes code associated with testing the closure, wherein the closure is implemented by an anonymous function;

parsing the white-box test case file to get the identification of the closure to be tested;

generating code to be inserted based on the identification of the closure to be tested, wherein the generated code enables access to the closure;

determining a closure, in a source code file to be tested, corresponding to the identification of the closure to be tested, the determination comprising searching one or more annotations associated with closures, the annotations being in a reservation position including a first position outside, a position inside or an end position of the closures associated with the annotations;

adding the generated code in the source code file at a predetermined position in the determined closure; and externally testing the closure according to the white-box test case file using the generated code.

5. The device according to claim 4, wherein the operations further comprise:

prior to acquiring the identification of the closure, setting a corresponding annotation in the reservation position of the closure to be tested.

6. The device according to claim 5, wherein corresponding relation information of the identification of the closure to be tested contained in the annotation is information with predetermined format.

7. A non-transitory computer-readable storage medium comprising an executable program to execute a method for closure testing, the method comprising:

acquiring a white-box test case file that includes code associated with testing the closure, wherein the closure is implemented by an anonymous function;

parsing the white-box test case file to get the identification of the closure to be tested;

generating code to be inserted based on the identification of the closure to be tested, wherein the generated code enables access to the closure;

determining a closure, in a source code file to be tested, corresponding to the identification of the closure to be tested, the determination comprising searching one or more annotations associated with closures, the annotations being in a reservation position including a first position outside, a position inside or an end position of the closures associated with the annotations;

adding the generated code in the source code file at a predetermined position in the determined closure; and externally testing the closure according to the white-box test case file using the generated code.

8. The non-transitory computer-readable storage medium of claim 7, wherein before the step of acquiring an identification of a closure to be tested, the method further comprises: previously setting a corresponding annotation in the reservation position of the closure to be tested.

9. The non-transitory computer-readable storage medium of claim 8, wherein corresponding relation information of the identification of the closure to be tested contained in the annotation is information with predetermined format.

* * * * *